C. L. POWELSEN.
ROTARY VALVE.
APPLICATION FILED MAY 19, 1911.
1,024,908.
Patented Apr. 30, 1912.
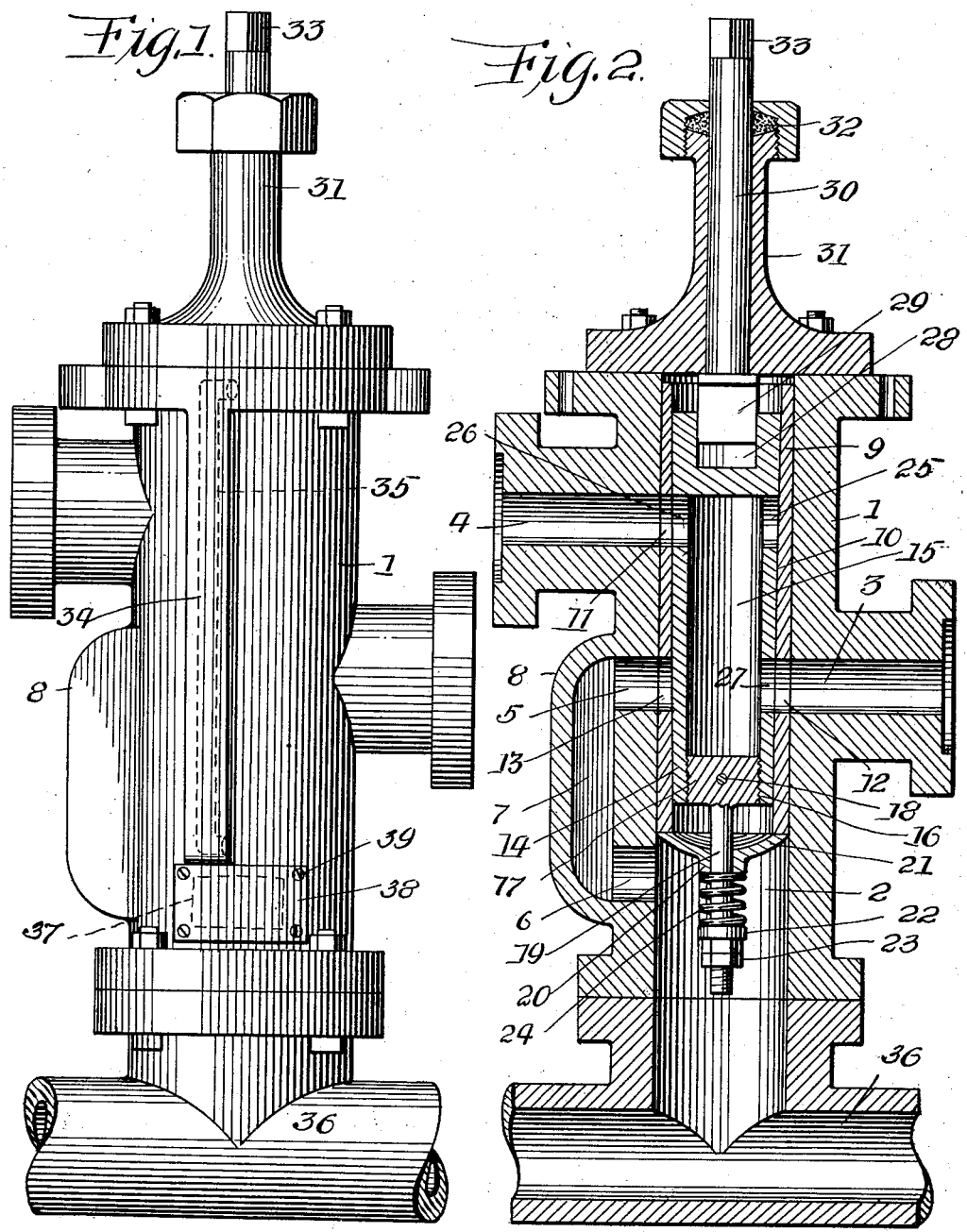
WITNESSES:
Samuel Payne
INVENTORS
C. L. Powelsen
BY
N. C. Everett & Co.
ATTORNEYS.

UNITED STATES PATENT OFFICE.

CHARLES LOUIS POWELSEN, OF SHARON, PENNSYLVANIA, ASSIGNOR OF ONE-HALF TO CHARLES SCHAUWEKER, OF SHARON, PENNSYLVANIA.

ROTARY VALVE.

1,024,908.    Specification of Letters Patent.    Patented Apr. 30, 1912.

Application filed May 19, 1911. Serial No. 628,232.

*To all whom it may concern:*

Be it known that I, CHARLES LOUIS POWELSEN, a citizen of the United States of America, residing at Sharon, in the county of Mercer and State of Pennsylvania, have invented certain new and useful Improvements in Rotary Valves, of which the following is a specification, reference being had therein to the accompanying drawing.

This invention relates to hydraulic valves especially designed for hoisting rolling mill tables, furnace and oven doors, elevators and other devices controlled by fluid pressure, and has certain features in common with my companion application, Serial No. 628,233.

The object of this invention is to provide an equally balanced hydraulic valve for positively controlling the operation or movement of a piston within a cylinder.

Another object of the invention is to furnish a valve of the above type, with means in a manner as will be hereinafter set forth, for compensating for the wear upon the valve.

Another object of this invention is to provide a valve of the above type that is positive in its action, free from injury by ordinary use and highly efficient for various purposes other than those above specified.

With the above and other objects in view the invention resides in the novel construction, combination and arrangement of parts to be hereinafter specifically described and then claimed.

Reference will now be had to the drawing, wherein:—

Figure 1 is a side elevation of the valve, and Fig. 2 is a vertical sectional view of the same.

The reference numeral 1 denotes a cylindrical valve body having a longitudinal bore 2 formed therein extending from end to end of the body. This bore is cylindrical and communicating with said bore is an inlet port 3, an outlet port 4 and by-pass ports 5 and 6, all of said ports being formed in the valve body 1 with the inlet port 3 intermediate the ends of the body, the outlet port 4 adjacent one end of the body, the port 5 diametrically opposite the inlet port 3 and the port 6 adjacent to the other end of the body. The ports 5 and 6 are in communication with a by-pass 7 formed in a longitudinal enlargement or boss 8, carried by the valve body 1.

Fitted in the bore 2 is a bushing 9 of a less length than the bore, the inner end of the bushing terminating in proximity to the port 6. The bushing 9 has a tapering seat 10 and formed in said bushing is a port 11 registering with the outlet port 4, said bushing further provided with ports 12 and 13 registering with the ports 3 and 5 respectively.

Rotatably mounted upon the seat 10 of the bushing 9 is a tapering plug valve 14 having a longitudinal bore 15. The inner end of the hollow plug valve is interiorly screw threaded as at 16 to receive a plug 17 retained in the said end of the bore 15 by a transverse rivet or pin 18. The plug 17 has a projecting stem 19 extending through a central apertured boss 20 of a cup shaped member 21 which engages the inner end of the bushing 9. The end of the stem 20 is screw threaded and provided with a washer 22 and nuts 23. Encircling the stem 19 between the boss 20 and the washer 22 is a coiled compression spring 24. The elements 17 to 24 inclusive constitute a tension device for normally retaining the valve 14 upon the seat 10, this device compensating for the wear of the seat 10, thereby insuring a positive connection between the valve and the seat of the bushing.

The outer end of the bore 15 terminates at a point removed from the outer end of the valve 14 and said outer end of the bore is in communication with diametrically opposed ports 25 and 26 formed in the valve, these ports alternately registering with the ports 11 and 4. The valve has another port 27 adapted to register with the ports 12 and 13.

The outer end of the valve 14 is provided with a socket 28 for the rectangular head 29 of a valve stem 30, said stem extending through a cap 31 suitably connected to the outer end of the body 1, said cap having a stuffing box 32 and the stem 30 having a rectangular shank 33 adapted to receive a lever or hand wheel (not shown).

The valve body 1 is provided with a longitudinal rib 34 having an equalizing port 35 formed therein. The outer end of the port 35 is in communication with the outer end of the bore 2 and the inner end of the port 35 is in communication with the inner end of the bore 2.

The valve body 1 has the inner end thereof suitably connected to a return pipe 36 and adjacent to the inner end of the valve body is an opening 37 in communication with the bore 2, this opening permitting of easy access being had to the nuts 23 whereby the tension of the spring 24 can be regulated. The opening 37 is normally closed by a plate 38 secured to the outer side of the valve body 1 by screws or other fastening means 39.

As an instance of the use of the valve, we will assume that the outlet port 4 is in communication with a cylinder containing a piston or plunger, that the inlet port 3 is supplied with fluid, such as air, water or steam, under pressure, and that the return pipe 36 is in connection with a suitable tank. When fluid is supplied to the port 3, it passes through the ports 12 and 27 into the bore 15 of the valve, through ports 26, 11 and 4 to the cylinder, wherein it serves its purpose. When the valve 14 is given a half revolution, the inlet port 3 is closed, the port 27 is placed in communication with the port 13 and the port 25 is placed in communication with the port 11. The fluid then exhausts from the cylinder through ports 4, 11 and 25, bore 15, ports 27, 13 and 5, by-pass 7, port 6 and bore 2 to the pipe 36. The exhaust in the bore 2 also fills the equalizing port 35 and maintains an equal pressure at the outer and inner ends of the valve 14.

From the foregoing it will be observed that the valve does not necessitate the use of leather or other material as a packing and that the tapered plug rotatably fitted in the bushing prevents leakage. The valve is extremely easy to operate. It has the advantage of being readily maintained in an operatable condition, as the tension device serves to hold the valve seated at all times, and which feature is advantageous in connection with hydraulic valves.

What I claim is:—

1. In a valve, a valve body having ports formed therein, a bushing arranged in said valve body and having ports formed therein in communication with the first mentioned ports, said bushing having a tapering seat formed therein, a plug valve rotatably fitted upon the seat of said bushing and having ports formed therein and a bore adapted to be placed in communication with the first mentioned ports, a plug mounted in the inner end of said plug valve, a projecting stem carried thereby, a cup shaped member loosely mounted upon said stem and normally engaging the inner end of said bushing, nuts carried by the inner end of said stem, and a coiled compression spring encircling said stem between said member and said nuts.

2. In a valve, a valve body having ports formed therein, a bushing arranged in said valve body and having ports formed therein in communication with the first mentioned ports, said bushing having a tapering seat formed therein, a plug valve rotatably fitted upon the seat of said bushing and having ports formed therein and a bore adapted to be placed in communication with the first mentioned ports, a plug mounted in the lower end of said plug valve, a projecting stem carried thereby, a cup shaped member loosely mounted upon said stem and normally engaging the inner end of said bushing, nuts carried by the inner end of said stem, a coiled compression spring encircling said stem between said member and said nuts, a longitudinal rib carried by said valve body and having an equalizing port formed therein establishing communication between the outer and inner ends of said valve body, and means including a valve stem having a head loosely engaging in the outer end of said plug valve and adapted to rotate said plug valve to establish communication between the various ports of said valve body.

3. In a valve, a valve body having a longitudinal bore, said valve body having an inlet port, an outlet port, and an exhaust port, a rotary valve mounted in the valve body having a longitudinally-extending central port, and transverse ports communicating therewith, said rotary valve closed at its ends, and an equalizing port disposed longitudinally of the valve body and in communication with the bore of the valve body at each end of the valve and with the exhaust port of said body.

4. In a valve, a valve body having a longitudinal bore, said body having an inlet port, an outlet port, and an exhaust port, a rotary valve mounted in the body having a longitudinally-extending port and transverse ports communicating with said longitudinal port, said rotary valve closed at its ends, means yieldingly engaging the valve for holding the same seated, and a longitudinally-extending equalizing port in communication with the valve body bore at the ends of the valve and also in communication with the exhaust port of said body.

5. In a valve, a valve body having a longitudinal bore, a bushing fitted in said bore of less length than the valve body, said valve body provided with an inlet port, an outlet port, and an exhaust port, a rotary valve fitted in said bushing and provided with a central longitudinal port closed at the ends of the valve, said bushing provided with transverse ports registering with the ports in the valve body and said valve having transverse ports communicating with the longitudinal port and yielding means mounted in the bore of the valve body and engaging the valve for maintaining the latter seated in the bushing.

6. In a valve, a valve body having a longitudinal bore, said valve body provided with an inlet port, an outlet port, and an exhaust port, a bushing fitted in the valve body and having transverse ports registering with the inlet port, outlet ports and exhaust port of the valve body, a rotary valve mounted in the bushing, said rotary valve having a longitudinal port and transverse ports adapted to register with the transverse ports in the bushing, and yielding means mounted in the bore of the valve body and engaging the valve for holding the same seated in the bushing.

7. In a valve, a valve body having a longitudinal bore, said valve body provided with an inlet port, an outlet port, and an exhaust port, a bushing fitted in the valve body and having transverse ports registering with the inlet port, outlet ports and exhaust port of the valve body, a rotary valve mounted in the bushing, said rotary valve having a longitudinal port and transverse ports adapted to register with the transverse ports in the bushing, and an equalizing port in communication with the bore of the valve body at both ends of the valve and in communication with the exhaust port whereby pressure on opposite ends of the valve is equalized.

8. In a valve, a valve body provided with an inlet port, an outlet port, and an exhaust port, a rotary valve in said body provided with ports adapted to register with the ports in the valve body, and an equalizing port in communication with the chamber in the valve body at the ends of the valve and also in communication with the exhaust port whereby pressure on opposite ends of the valve is equalized.

In testimony whereof I affix my signature in the presence of two witnesses.

CHARLES LOUIS POWELSEN.

Witnesses:
KARL H. BUTLER,
MAX H. SROLOVITZ.

---

Copies of this patent may be obtained for five cents each, by addressing the "Commissioner of Patents, Washington, D. C."

Correction in Letters Patent No. 1,024,908.

Affidavit having been filed showing that the name of the patentee in Letters Patent No. 1,024,908, granted April 30, 1912, for an improvement in "Rotary Valves," should have been written and printed *Charles Louis Powelson* instead of "Charles Louis Powelsen," it is hereby certified that the proper correction has been made in the files and records pertaining to the case in the Patent Office and should be read in the said Letters Patent that the same may conform thereto.

Signed and sealed this 16th day of July, A. D., 1912.

[SEAL.]

C. C. BILLINGS,
*Acting Commissioner of Patents.*